United States Patent
Pan et al.

(10) Patent No.: US 9,485,613 B2
(45) Date of Patent: Nov. 1, 2016

(54) WIRELESS PAIRING AND TRACKING SYSTEM FOR LOCATING LOST ITEMS

(71) Applicant: Salutica Allied Solutions SDN. BHD., Lahat, Ipoh (MY)

(72) Inventors: Yoon Shing Pan, Ipoh (MY); Kean Hoo Chong, Ipoh (MY); Wee Yeoh Tan, Ipoh (MY); Chang Tih Ho, Ipoh (MY)

(73) Assignee: SALUTICA ALLIED SOLUTIONS SDN. BHD., Lahat, Ipoh, Perak (MY)

( * ) Notice: Subject to any disclaimer, the term of this patent is extended or adjusted under 35 U.S.C. 154(b) by 0 days.

(21) Appl. No.: 14/418,120

(22) PCT Filed: Jan. 31, 2013

(86) PCT No.: PCT/MY2013/000017
§ 371 (c)(1),
(2) Date: Jan. 29, 2015

(87) PCT Pub. No.: WO2014/042507
PCT Pub. Date: Mar. 20, 2014

(65) Prior Publication Data
US 2015/0296477 A1 Oct. 15, 2015

(30) Foreign Application Priority Data
Sep. 13, 2012 (MY) .......................... PI2012004064

(51) Int. Cl.
*H04W 4/00* (2009.01)
*H04W 4/02* (2009.01)

(52) U.S. Cl.
CPC .............. *H04W 4/02* (2013.01); *H04W 4/008* (2013.01)

(58) Field of Classification Search
None
See application file for complete search history.

(56) References Cited

U.S. PATENT DOCUMENTS

| 6,297,737 | B1 | 10/2001 | Irvin |
| 7,522,540 | B1* | 4/2009 | Maufer ................ H04L 45/18 370/254 |
| 2002/0019238 | A1 | 2/2002 | McDonnell et al. |
| 2003/0227392 | A1* | 12/2003 | Ebert ..................... G06K 17/00 340/8.1 |
| 2005/0226201 | A1* | 10/2005 | McMillin ............... H04L 45/00 370/348 |
| 2006/0055538 | A1 | 3/2006 | Ritter |

FOREIGN PATENT DOCUMENTS

EP 2053573 4/2009

* cited by examiner

*Primary Examiner* — Diane Mizrahi
(74) *Attorney, Agent, or Firm* — Sand & Sebolt

(57) ABSTRACT

The present invention relates to a wireless pairing and tracking system for lost item searching, the system includes: a) an observing device (NODE Owner); b) at least one associating identifier device (NODE) with wireless or Radio Frequency (RF) link; c) at least one participating observing device; and d) a host apparatus; wherein the observing device (NODE Owner) and the participating observing device are implemented with suitable application software (NODE-APP) in association with the host apparatus; and wherein any lost identifier devices (LOST-NODE) is discovered by any participating observing device whenever the participating observing device comes near within Radio Frequency (RF) range of the LOST NODE.

27 Claims, 4 Drawing Sheets

WIRELESS PAIRING AND TRACKING SYSTEM FOR LOCATING LOST ITEMS

FIELD OF INVENTION

The present invention relates generally to a wireless system for finding lost objects, and more particularly to a wireless pairing and tracking system for locating lost items.

BACKGROUND OF INVENTION

Portable communication systems and devices have been integrated into many facets of daily life and are now commonly carried by persons or users throughout the day. In the last few years, there have been tremendous advances in the development and expansion of the internet, making it a universal, world-wide communication medium. Meanwhile, there has been a significant increase in the number of types of personal electronic devices. These devices include cellular telephones, smartphones and portable digital assistant such as laptop, tablet computer and messaging devices which are in association with applications software for executing the devices.

Wireless local network area networks (WLANs) and wireless personal area networks (WPANs), generally known as Wi-Fi networks, provide a wireless interconnection of computing devices and personal communication devices. It is known in the art that a location of wireless devices on roaming object is generally determined by achieving ad-hoc or special short range wireless connectivity between the wireless devices and communication devices. Such wireless and communication devices may include, for example, a Bluetooth enabled mobile or cellular phone, which can be located by the use of Global Positioning System (GPS) or any network-based applications and/or technologies.

However, it has always been found that the locating of lost items such as, for example, personal property/belongings, pets, missing persons or children, or any other valuables is typically difficult and very time consuming. There have been a number of attempts to track personal property so that lost property or belongings can be returned or recovered to its owners should the same be found.

A number of different approaches have been taken but each has resulted in less than satisfactory results. To consider one example, persons who can assist in searching for the lost item are limited to proximate people, relatives, friends or local authorities such as policemen. However, these approaches require human effort to search for the lost item. Moreover, the requirement of human effort usually results to increases in cost of service, delays in process and sometimes being error prone.

It has also been found in many cases where the lost item happens to be within the proximate of, or have come into contact with, other persons. However, such lost items are usually ignored due to lack of awareness and limited publicity of the said lost item. It is to be found that some individuals may want to assist in recovering and returning the lost item, but remain unaware of such lost items.

In view of these and other shortcomings, it is advantageous to provide a wireless system for finding lost objects, and more particularly to a wireless pairing and tracking system for locating lost items. The present invention advantageously provides a wireless system to efficiently and easily locate lost items or personal property. Accordingly, the present invention provides a wireless system for finding lost objects which is enable to pair and/or track lost items or personal property using wireless network.

SUMMARY OF THE INVENTION

The present invention relates to a wireless pairing and tracking system for lost item searching. Accordingly, the system includes: a) an observing device (NODE Owner); b) at least one associating identifier device (NODE) with wireless or Radio Frequency (RF) link; c) at least one participating observing device; and d) a host apparatus; wherein the identifier device (NODE) is entered into "Broadcasting Mode" in the event that the wireless or Radio Frequency (RF) link between the identifier device (NODE) and the observing device (NODE Owner) is disconnected; wherein the observing device (NODE Owner) and the participating observing device are implemented with suitable application software (NODE-APP) in association with the host apparatus; wherein the application software (NODE-APP) of the observing device (NODE Owner) sends identity of identifier device (NODE-ID) to the host apparatus or database server (NODE-SERVER) to register the NODE-ID as a "LOST NODE" in the event that the wireless or Radio Frequency (RF) link between the identifier device (NODE) and the observing device (NODE Owner) is disconnected; wherein the application software (NODE-APP) of participating observing devices is connected to the host apparatus or database server (NODE-SERVER) (40) to pull all the "LOST NODE" data periodically in the event that the wireless or Radio Frequency (RF) link between the identifier device (NODE) and the observing device (NODE Owner) is disconnected; and wherein any lost identifier devices (LOST-NODE) is discovered by any participating observing device whenever the participating observing device comes near within Radio Frequency (RF) range of the LOST NODE.

Accordingly, the host apparatus includes any wireless network communication devices or database server (NODE-SERVER) which is accessible through internet and/or wireless or Radio Frequency (RF) link.

In accordance with preferred embodiments of the present invention, the identifier device (NODE) and/or any lost identifier devices (LOST-NODE) is paired with the observing device (NODE Owner) and/or participating observing devices via wireless or Radio Frequency (RF) connection. Preferably, the wireless or Radio Frequency (RF) connection is a Bluetooth connection.

It will be appreciated that the identity of identifier device (NODE-ID) is stored in the observing device (NODE Owner) via the application software (NODE-APP) after the identifier device (NODE) is paired with the observing device (NODE Owner). In the preferred embodiments, the observing device (NODE Owner) and participating observing device provide infrastructure for the system such as power supply and a user interface. Preferably, the power supply is a battery or any other portable current source powers. The user interface of the observing device includes visual monitor or display, audible signal, or vibration signal.

In the preferred embodiments, the observing device (NODE Owner) and participating observing device includes a Bluetooth-enabled cellular or mobile phone, smart phone, laptop, tablet computer or any communication devices and the like. In accordance with preferred embodiments of the present invention, the identifier devices (NODE) include a tag which is equipped with wireless or Radio Frequency (RF) connection device. It will be appreciated that the wireless or Radio Frequency (RF) connection device includes Bluetooth and/or any other suitable devices which are capable of communicating with the observing device (NODE Owner) and/or participating observing device.

Accordingly, the identifier device (NODE) is configured or attached to any object, item or personal belonging that is to be monitored in the event that it has gone missing. Preferably, the identifier device (NODE) is to be carried, embedded, configured or attached to any object, item or personal belonging by means of string tied, wrist wrap, put-in pocket, stick-on, embedded therein, etc.

The identifier device (NODE) is provided with a processor to hold application software. Moreover, the identifier device (NODE) is further provided with a power source. Preferably, the power source may be a battery or any other portable current source powers or solar powers.

The identifier device (NODE) is further provided with a tilt sensor and/or an accelerometer for detecting the movement of the identifier device (NODE). Said identifier device (NODE) (30) further includes a Real Time Clock chip which serves to provide current date and time to the processor. In the preferred embodiments, the processor serves to detect the movements of the identifier device (NODE) and record the date and time of such instance.

In the event that Real Time Clock is not provided and the identifier device (NODE) is stopped from moving, the processor in the identifier device (NODE) starts its timer and continuously recording elapsed time. Accordingly, the recorded elapsed time indicates time interval of the identifier device (NODE) has been stopped from being moved, and defined as "Last Being Moved Time Interval".

In the event that the identifier device (NODE) is being moved again, the processor in the identifier device (NODE) stops the timer and reset the elapsed time to zero. Accordingly, the elapsed time remains zero until the identifier device (NODE) is stopped from being moved again for certain time interval, which the processor will start the time elapsed recording steps over again.

It will be appreciated that the observing device (NODE Owner) of the present invention is provided with a Global Positioning System (GPS) chip, which is used in combination with a GPS antenna to detect the observing device's geographical coordinates. The observing device (NODE Owner) is further provided with a Wi-Fi chip in combination with a Wi-Fi antenna to detect the observing device's geographical coordinates and to connect the observing device (NODE Owner) to the internet. The observing device (NODE Owner) is also provided with a 3G chip in combination with a 3G antenna to detect the observing device's geographical coordinates and to connect the observing device to the internet. Said observing device (NODE Owner) is further provided with a processor to run the application software (NODE-APP).

The user can activate a "Search for Me" or "Web Search Me" function in the observing device (NODE Owner) via application software (NODE-APP).

In the preferred embodiment of the present invention, the "LOST NODE" data will be stored into NODE-APP-LOST-NODE-ID database of the participating observing devices, and the participating observing devices (70) will have this latest LOST NODE's ID stored. It is to be noted that the application software (NODE-APP) can be either working as an active software application in the participating observing devices or running at the background of the participating observing devices.

Accordingly, the application software (NODE-APP) is implemented by pre-installing in the observing devices by the manufacturer, or to be downloaded and/or installed by end users. The application software (NODE-APP) in any of the participating observing devices will scan its environment and to check any Broadcasting NODE or LOST NODE within the Radio Frequency (RF) range. In the event that the participating observing device detected the Broadcasting NODE and/or LOST NODE, participating observing devices will connect to the LOST NODE and retrieve the NODE's ID. Accordingly, the participating observing devices enable to retrieve the LOST NODE's ID and compare within the NODE-APP-LOST NODE-ID database. The participating observing devices is come to into Radio Frequency (RF) range of the LOST NODE if there is a match between the NODE's ID and the NODE-APP-LOST-NODE-ID database.

Alternatively, the Broadcasting NODE and/or LOST NODE can also be detected, where after retrieving the LOST NODE's ID, the NODE-APP of the participating observing device can send the LOST NODE's ID to the NODE-SERVER and to allow the NODE-SERVER to perform a search in its LOST NODE database. If there is a match of LOST NODE's ID in the LOST NODE database, the NODE-SERVER will notify the NODE-APP of the participating observing device that it comes into RF range of the LOST NODE.

Accordingly, after confirm LOST NODE is found, the application software (NODE-APP) will then activate the participating observing device's Mobile Position/Location Determination function to obtain the geographical coordinates. The geographical coordinates information with Received Signal Strength Indication (RSSI) value between the LOST NODE found and the participating observing devices will then be updated to the database server (NODE-SERVER). The latest LOST NODE movement date and time (or "Last Being Moved Time Interval") is also updated to the database server (NODE-SERVER). Accordingly, in the event that the Real Time Clock is not provided in the system, the total time elapsed since the last movement of the LOST NODE ("Last Being Moved Time Interval") will be retrieved by participating observing device and updated to the database server (NODE-SERVER). The "Last Being Moved Time Interval" is the total time elapsed since the last movement of the LOST NODE.

It will be appreciated that the NODE-SERVER immediately push all information to the observing device (NODE Owner), which reported the LOST NODE via "Search for Me" or "Web Search Me" activation. Accordingly, the application software (NODE-APP) of the observing device (NODE Owner) will alert the user and show the geographical coordinates information which has been stored in the database server (NODE-SERVER), by either pulled from or pushed by the NODE-SERVER. It is to be noted that the application software (NODE-APP) of the observing device (NODE Owner) will only pull the geographical coordinates with highest RSSI value, or the NODE-SERVER will only push the geographical coordinates with highest RSSI value to the observing device (NODE Owner), should more than one participating observing devices detect the LOST NODE.

Accordingly, the user has the option to send his/her contact information to the database server (NODE-SERVER). The contact information will either be pulled by the participating observing device's NODE-APP or pushed by NODE-SERVER to the participating observing device's NODE-APP. The application software (NODE-APP) of the participating observing device will then alert or inform the participant of the contact information of the user.

It will be appreciated that the application software (NODE-APP) will alert the user to deactivate the "Search for Me" or "Web Search Me" function whenever the user's observing device (NODE Owner) comes within Radio Frequency (RF) range of the LOST NODE. It will also be appreciated that the application that the application software (NODE-APP) of the observing device (NODE Owner) will automatically identify and connect to the LOST NODE, said NODE-APP will then alert the user and show the "LOST NODE RSSI" value. The nearer the observing device (NODE Owner) approaches the LOST NODE, the higher RSSI value; and the user is based on the RSSI value to find and retrieve back the LOST NODE. The application software (NODE-APP) will then update the database server (NODE-SERVER) that the LOST NODE has been found as soon as the user de-activates the "Search for Me" or "Web Search Me" function.

The present invention consists of several novel features and a combination of parts hereinafter fully described and illustrated in the accompanying description and drawings, it being understood that various changes in the details may be made without departing from the scope of the invention or sacrificing any of the advantages of the present invention.

BRIEF DESCRIPTION OF THE DRAWINGS

The present invention will be fully understood from the detailed description given herein below and the accompanying drawings which are given by way of illustration only, and thus are not limitative of the present invention, wherein.

DETAILED DESCRIPTION OF THE PREFERRED EMBODIMENTS

Figure 1:
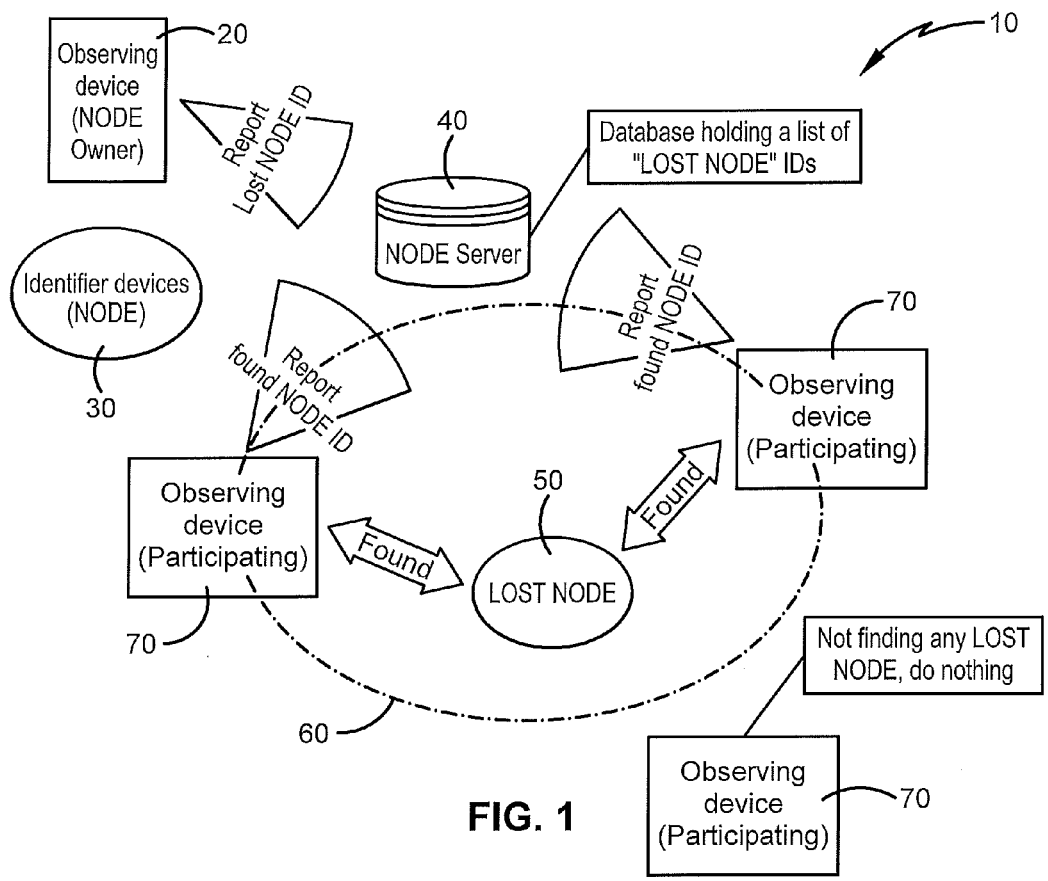
FIG. 1 is a diagrammatic overview of a wireless pairing an tracking system for lost item searching in accordance with preferred embodiments of present invention.

The present invention relates to a wireless system for finding lost objects, and more particularly to a wireless pairing and tracking system for locating lost items. Hereinafter, this specification will describe the present invention according to the preferred embodiments of the present invention. However, it is to be understood that limiting the description to the preferred embodiments of the invention is merely to facilitate discussion of the present invention and it is envisioned that those skilled in the art may devise various modifications and equivalents without departing from the scope of the appended claims.

The wireless pairing and tracking system for finding and/or locating lost items according to the preferred embodiments of the present invention will now be described in accordance to the accompanying drawings FIGS. 1 to 3c, either individually or in any combination thereof.

The wireless pairing and tracking system (10) of the present invention generally includes one or more associating identifier devices (named as NODE) (30); an observing device (named as NODE Owner) (20) which is preferably implemented with suitable application software, i.e. observing device's application (hereinafter referred to as NODE-APP) and in association with host apparatus such as for example a database server (named as NODE-SERVER) (40), wireless or Radio Frequency (RF) connection devices and the like as will be further described. It is contemplated that any lost identifier devices (named as LOST-NODE) (50) can be discovered by any participating observing device (70) whenever the participating observing device (70) comes near within Radio Frequency (RF) range (60) of the LOST NODE (50).

It will be appreciated that the observing device (20) and participating observing device (70) provides infrastructure for the system such as power supply and a user interface. Accordingly, the power supply of the observing device may include, for example, a battery or any other portable current source powers. The user interface of the observing device may include, for example, one or more of the following: visual monitor or display, audible signal, or vibration signal. In the preferred embodiments, the observing device (20) and participating observing device (70) may include for example, but not limited to a Bluetooth-enabled cellular or mobile phone, smart phone, laptop, tablet computer or any communication devices and the like. The identifier devices (named as NODE) (30) may include for example, but not limited to a tag equipped with wireless or Radio Frequency (RF) connection device such as Bluetooth and/or any other suitable devices which are capable of communicating with the observing device (20) and/or participating observing device (70).

In the preferred embodiments of the present invention, the wireless pairing and tracking system (10) involves using the observing device (20) and participating observing device (70) applications (NODE-APP), which are in communication with the associating identifier devices (NODE) (30) and/or any lost identifier device (LOST-NODE) (50) via the suitable host apparatus. The host apparatus may include any wireless network communication devices or the database server (NODE-SERVER) (40) which is accessible through internet and/or the wireless or Radio Frequency (RF) link such as, for example but not limited to, by using Bluetooth technology.

Accordingly, the identifier device (NODE) (30) is paired with the observing device (NODE Owner) (20) via wireless or Radio Frequency (RF) connection. Preferably, the wireless or Radio Frequency (RF) connection may be, for example but not limited to Bluetooth connection. The NODE-APP will handle this pairing. It is to be noted that one identifier device (NODE) (30) can only be paired with one observing device (NODE Owner) (20) at one time. After being paired with the associating identifier device (NODE) (30), an identity of the identifier device (hereinafter referred to as NODE-ID) will be stored in the paired observing device (NODE Owner) (20) via the NODE-APP.

In the preferred embodiments, the identifier device (NODE) (30) is preferably to be carried, embedded, configured or attached to any object, item or personal belonging that is to be monitored in the event that it has gone missing. Accordingly, the NODE (30) will be put together and follow along with a potential missing object, item or personal belonging by any means such as, for example, but not limited to string tied, wrist wrap, put-in pocket, stick-on or embedded therein, etc.

Figure 2:
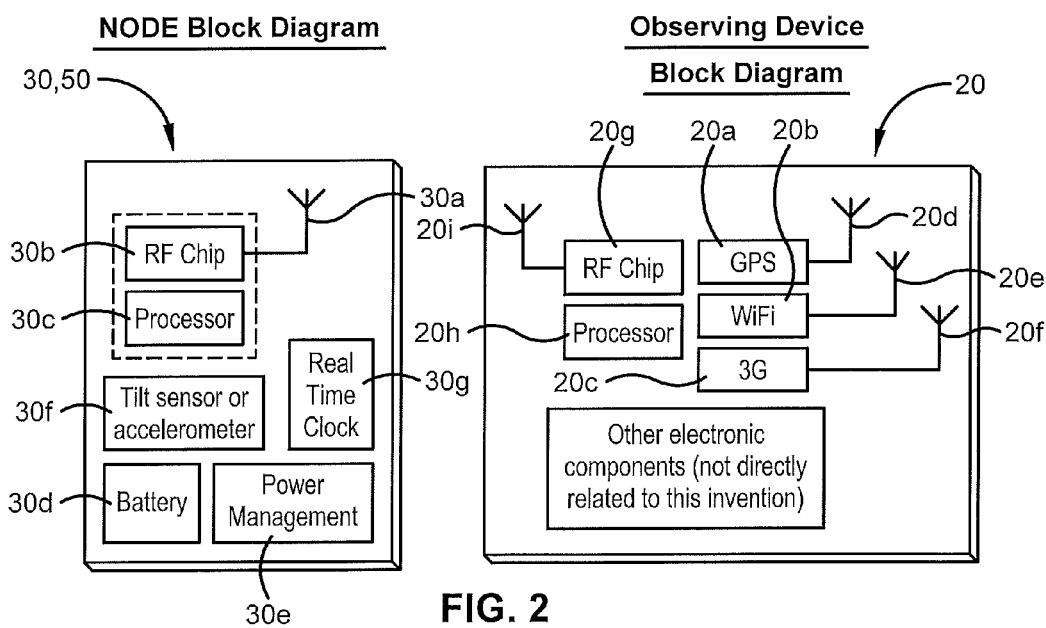
FIG. 2 is a block diagram of an identifier device (NODE) and an observing device of the wireless pairing and tracking system embodying the invention.

As can be seen in FIG. 2, the identifier device (NODE) (30) is preferably equipped with a Radio Frequency antenna (30a) for transmitting and receiving RF signals. A Radio Frequency (RF) chip (30b) with specific RF protocol stacks, such as for example, but not limited to Bluetooth, including RF transmitter and receiver chips are also provided in the NODE (30). The NODE (30) is further provided with a processor (30c) that holds application software. It will be appreciated that the Radio Frequency (RF) chip (30b) and the processor (30c) may be combined into one chip using System on Chip Technology. A power source such as battery (30d) or any other portable current source powers or solar powers is also provided in the NODE (30). It will be appreciated that power management circuitries (30e) are provided to manage voltage levels and current consumption of the NODE (30). If desired, the identifier device (NODE) (30) further includes a tilt sensor and/or an accelerometer (30f) for detecting the movements of NODE (30). Accordingly, when movements of the NODE (30) are detected, it will be detected by the processor (30c) and the processor (30c) will record the date and time of such instance. Real Time Clock chip (30g) is also provided and serves to provide the current date and time to the processor (30c).

In the preferred embodiments, the observing device (NODE Owner) (20) may include a Global Positioning System (GPS) chip (20a) which is used in combination with GPS antenna (20d) to detect the observing device's geographical coordinates. Accordingly, the GPS antenna (20d) serves to receive GPS signals from GPS satellite. A Wi-Fi chip (20b) is also provided in the observing device (20) and to be used in combination with Wi-Fi antenna (20e) to detect the observing device's geographical coordinates, as well as to connect the observing device (20) to the interne. Accordingly, the WiFi antenna (20e) serves to transmit and receive WiFi signals. The observing device (NODE Owner) (20) is further provided with a 3G chip (20c) which is used in combination with a 3G antenna (20f to detect the observing device's geographical coordinates and to connect the observing device (20) to the internet. Accordingly, the 3G antenna (20f serves to transmit and receive 3G signals.

The observing device (NODE Owner) (20) of the preferred embodiment of the present invention is equipped with a Radio Frequency antenna (20i) for transmitting and receiving RF signals. A Radio Frequency (RF) chip (20g) with specific RF protocol stacks, such as for example, but not limited to Bluetooth, and RF transmitter and receiver chips are also provided in the observing device (NODE Owner) (20). It will be appreciated that a processor (20h) is provided to hold and to run all application software of the observing device (NODE Owner) (20) via the NODE-APP.

Figure 3A:
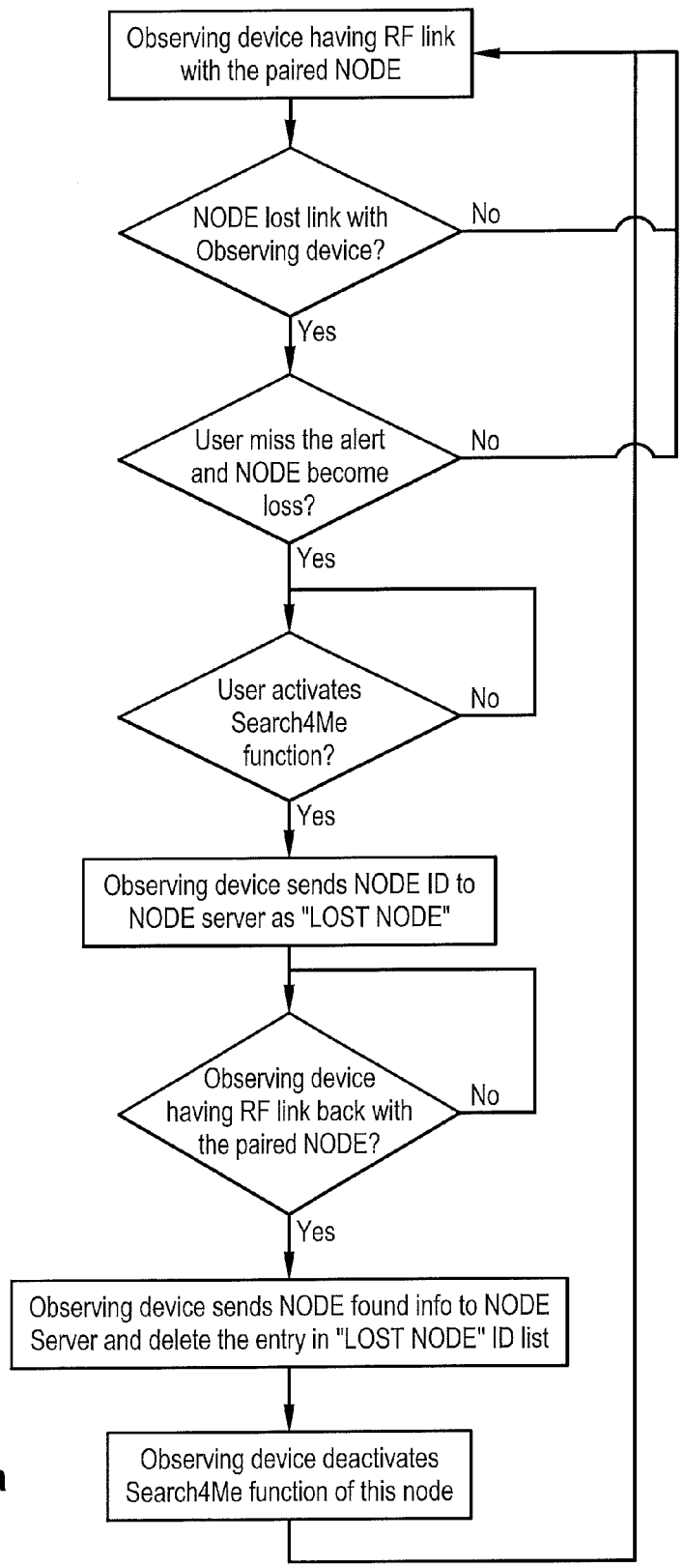
FIG. 3a is a flow diagram illustrating a sequence of activating an operation of "Search for Me" or "Web Search Me" function in accordance with preferred embodiments of present invention.

Referring now to FIG. 3a, the flow diagram illustrates the sequence of events that the user will use, for example the operation of the "Search for Me" or "Web Search Me" function in accordance with the preferred embodiments of the present invention. In the event that the identifier device (NODE) (30) is moving far away from the observing device (NODE Owner) (20) until its Radio Frequency (RF) link is disconnected, the NODE (30) will enter into "Broadcasting Mode", and the NODE-APP will alert the user by sending alert ringtones, sounds, visual display signals, or mechanical vibration alerting signals. In the event that the user did not notice this alert and the NODE (30) keep moving further from the observing device (NODE Owner) (20) until it is lost and/or the user cannot retrieve the NODE (30), the user can then activate the "Search for Me" or "Web Search Me" function via the NODE-APP. As soon as the "Search for Me" or "Web Search Me" function is activated, the NODE-APP will send the NODE-ID to the NODE-SERVER (40) to register the NODE-ID as a "LOST NODE".

The NODE-APP in all participating observing devices (70) as always be connected to the NODE-SERVER (40) to pull all the "LOST NODE" data periodically and store the same information into a NODE-APP-LOST-NODE-ID database of the participating observing devices (70), and the participating observing devices (70) will have this latest LOST NODE's ID stored. This action is done periodically to ensure all participating observing devices (70) are having the latest NODE-APP-LOST-NODE-ID in their database. It is to be noted that the NODE-APP can perform this action automatically without user intervention when the NODE-APP is either working as active software application in the participating observing devices (70) or running at the background of the participating observing devices (70).

It will be appreciated that the NODE-APP may be implemented in various ways on different observing devices (20, 70) such as for example, cellular phone or smart phone platforms and environments consistent with the principle of the present invention, provided that they are adapted to perform essentially the searching, tracking, monitoring and alerting functions. The NODE-APP may be implemented by pre-installing in the observing devices (20, 70) by the manufacturer, or may be downloaded and/or installed by end users.

Figure 3B:
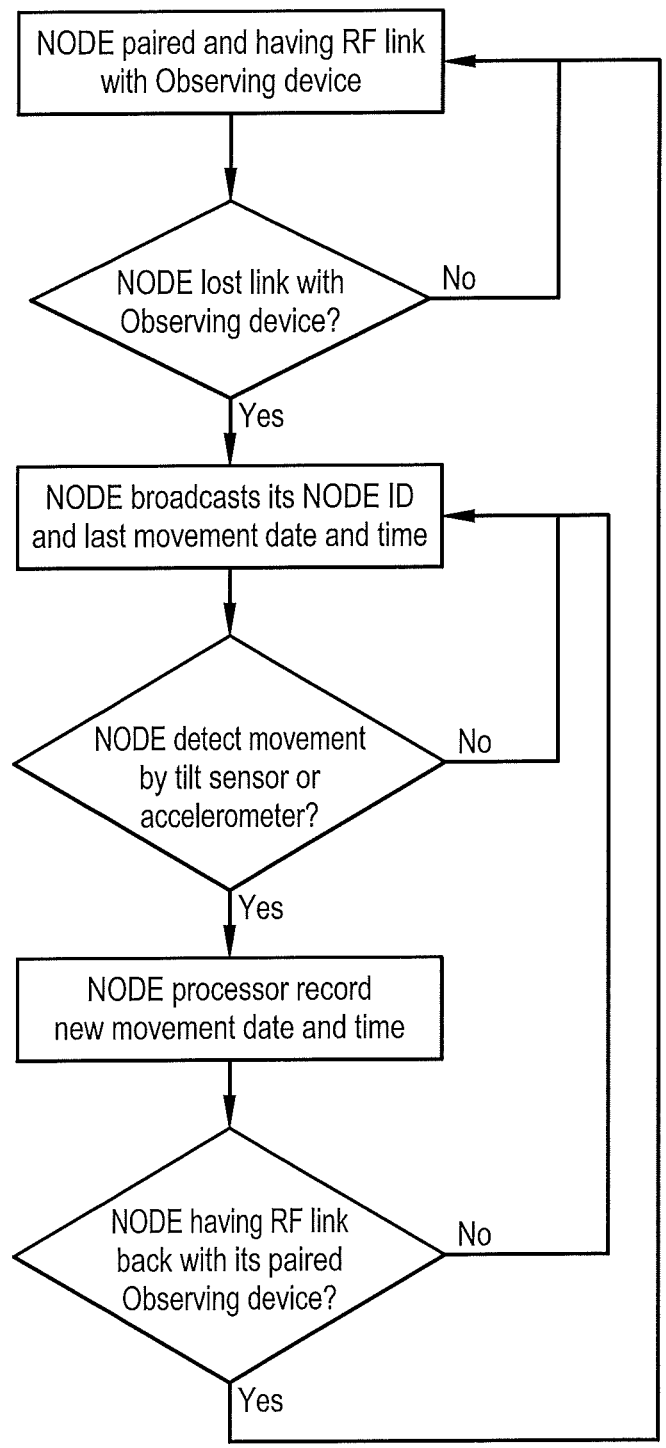
FIG. 3b is a flow diagram illustrating example of operation of the identifier device (NODE) in the event that wireless or Radio Frequency (RF) link of the identifier device with the observing device is disconnected.

Referring now to FIG. 3b, it is contemplated that processor (30c) of the LOST NODE (50) will continuously monitor if there is movement of the LOST NODE (50) detected by the tilt sensor and/or accelerometer (300. Accordingly, in the event that there is movement of the LOST NODE (50) detected, the processor (30f) will pull all date and time information from the Real Time Clock chip (30g). The LOST NODE (50) will continuously broadcast its existence within its Radio Frequency (RF) range (60).

It is to be notes that in the event that Real Time Clock is not provided and the identifier device (NODE) (30) is stopped from moving, the processor (30c) in the identifier device (NODE) (30) starts its timer and continuously recording elapsed time. In this case, the movement of the identifier device (NODE) (30) is detected by the tilt sensor or accelerometer for certain time intervals, for instance, x seconds where x may be 10 or 5 seconds depending on the time of the identifier device (NODE) (30) being stopped from moving. Accordingly, the recorded elapsed time indicates time interval of the identifier device (NODE) (30) has been stopped from being moved is defined as "Last Being Moved Time Interval".

In the event that the identifier device (NODE) (30) is being moved again, the processor (30c) in the identifier device (NODE) (30) stops its timer and reset the elapsed time to zero. Accordingly, the elapsed time remains zero until the identifier device (NODE) (30) is stopped from being moved again for certain time interval (x seconds), which the processor (30c) will start the time elapsed recording steps over again.

Figure 3C:
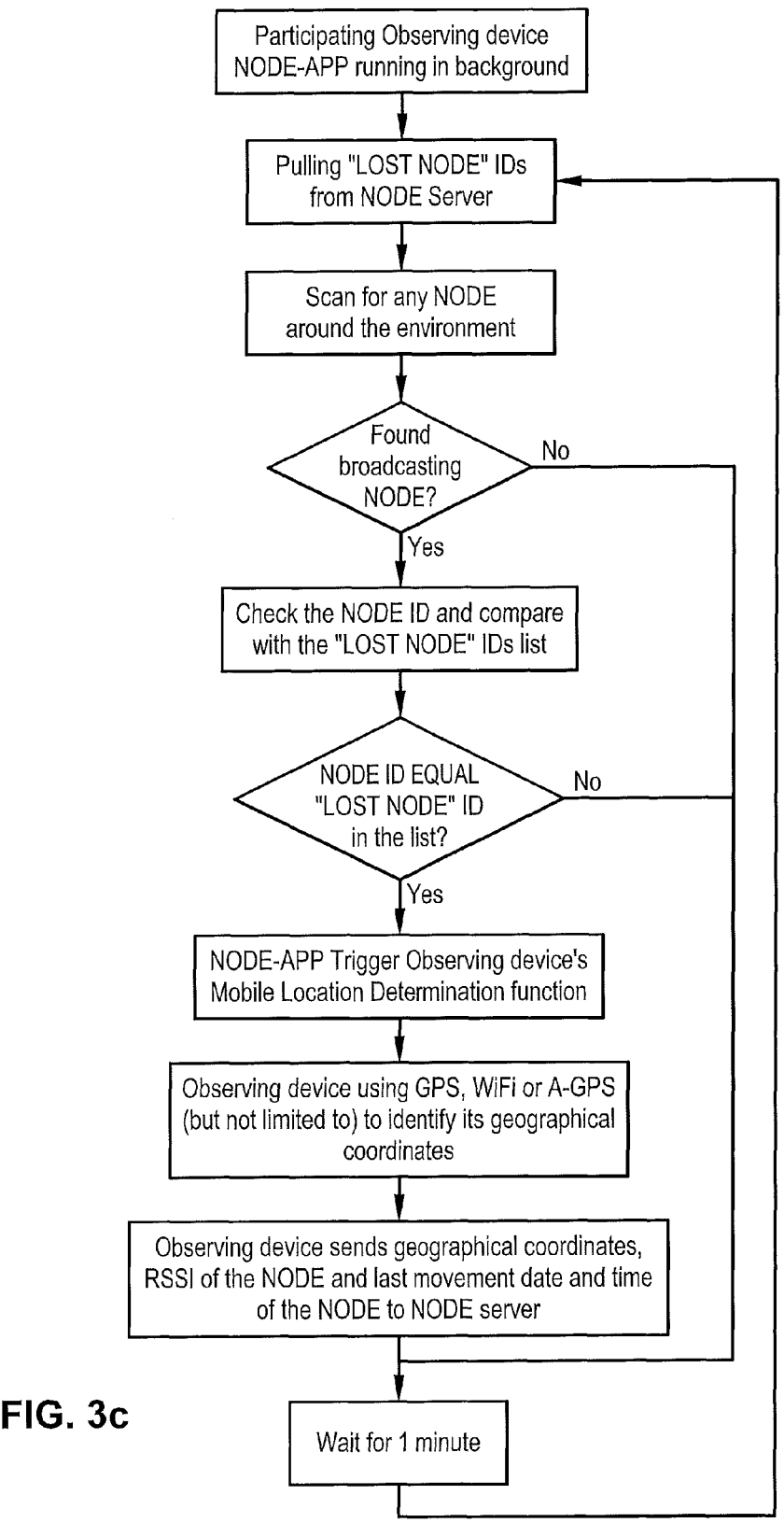
FIG. 3c is a flow diagram illustrating example of operation of a participating observing device in the event that the participating observing device comes close to a lost identifier device (LOST-NODE).

At the meantime, the NODE-APP in any of the participating observing devices (70) will scan its environment, within RF link range (60), checking should there be any Broadcasting NODE (30) or LOST NODE (50). Whenever the NODE-APP successfully scans any Broadcasting NODE (30) or LOST NODE (50), it will retrieve the LOST NODE's ID and to compare within the NODE-APP-LOST-NODE-ID database which has been previously stored in the participating observing devices (70) (FIG. 3c). If the NODE-APP finds a matching NODE's ID from the NODE-APP-LOST-NODE-ID database, it would mean that the user of the participating observing device (70) comes into Radio Frequency (RF) range (60) of the LOST NODE (50). Accordingly, the participating observing devices (70) will connect to the LOST NODE (50) and retrieve the LOST NODE's ID in the event that the participating observing devices (70) detected the Broadcasting NODE (30) and/or LOST NODE (50). The participating observing devices (70) retrieve the LOST NODE's ID and compare within the NODE-APP-LOST NODE-ID database. The participating observing devices (70) is come to into Radio Frequency (RF) range (60) of the LOST NODE (50) if there is a match between the NODE's ID and the NODE-APP-LOST-NODE-ID database.

Alternatively, the Broadcasting NODE (30) and/or LOST NODE (50) can be detected, whereby after retrieving the LOST NODE's ID, the NODE-APP of the participating observing device (70) can send the LOST NODE's ID to the NODE-SERVER (40) and to allow the NODE-SERVER (40) to perform a search in its LOST NODE database. If there is a match of LOST NODE's ID in the LOST NODE database, the NODE-SERVER (40) will notify the NODE-APP of the participating observing device (70) that it comes into RF range of the LOST NODE (50).

After confirm LOST NODE is found, the application software (NODE-APP) will then activate the participating observing device's (70) Mobile Position/Location Determination function to obtain the geographical coordinates. It is to be noted that the geographical coordinates information, together with the Received Signal Strength Indication (RSSI) value between the LOST NODE (50) found and the participating observing devices (70), as well as latest LOST NODE's movement date and time (or "Last Being Moved Time Interval") will be updated to the NODE-SERVER (40). Accordingly, in the event that the Real Time Clock is not provided in the system, the total time elapsed since the last movement of the LOST NODE (50) ("Last Being Moved Time Interval") will be retrieved by participating observing device (70) and updated to the database server (NODE-SERVER) (40).

After this participating observing device (70) has updated the mentioned information to the NODE-SERVER (40), the NODE-SERVER (40) will immediately push this information to the observing device (NODE Owner) (20) which reported the LOST NODE (50) via "Search for Me" or "Web Search Me" activation. The NODE-APP of this observing device (NODE Owner) (20) will alert the user and show the geographical coordinates information that has been stored in the NODE-SERVER (40) database, by either pulled from or pushed by the NODE-SERVER (40).

In the event of more than one geographical coordinates information in the NODE-SERVER (40) database, i.e. more than one participating observing devices (70) detected the LOST NODE (50) and reported the geographical coordinates information within a certain specific time frame, the NODE-APP of the observing device (NODE Owner) (20) will only pull the geographical coordinates with highest RSSI value, or the NODE-SERVER (40) will only push the geographical coordinates with highest RSSI value to the observing device (NODE Owner).

The user of the observing device (NODE Owner) (20) has the option to send his/her contact information to the NODE-SERVER (40) database. Accordingly, the contact information will either be pulled by the participating observing device's (70) NODE-APP or pushed by NODE-SERVER (40) to the participating observing device's (70) NODE-APP. This NODE-APP of the participating observing devices (70) will then alert or inform the participant of the contact information of the user. The participant may either opt to contact or not to contact the user.

It will be appreciated that the user of the observing device (NODE Owner) (20) will track the LOST NODE (50) by searching the area of the geographical coordinates received as mentioned above. In this event that, whenever the observing device (NODE Owner) (20) comes within Radio Frequency (RF) range (60) of the LOST NODE (50), the NODE-APP of the observing device (NODE Owner) (20) will automatically identify and connect to the LOST NODE (50). The NODE-APP will then alert the user and show the "LOST NODE RSSI" value, the nearer the observing device approaches the LOST NODE (50), the higher RSSI value will be. It will be appreciated that the user will base on the RSSI value to finally find and retrieve back the LOST NODE (50). The NODE-APP will then alert the user to deactivate the "Search for Me" or "Web Search Me" function. As soon as the user has de-activated the "Search for Me" or "Web Search Me" function, the NODE-APP will update the NODE-SERVER (40) database that the NODE-ID of the LOST NODE (50) has been found.

The invention being thus described, it will be obvious that the same may be varied in many ways. Such variations are not to be regarded as a departure from the principle and scope of the invention, and all such modifications as would obvious to one skilled in the art intended to be included within the scope of following claims.

The invention claimed is:

1. A wireless pairing and tracking system for lost item searching, the system includes:
   a) an observing device (NODE Owner);
   b) at least one associating identifier device (NODE) with wireless or Radio Frequency (RF) link;
   c) at least one participating observing device; and
   d) a host apparatus;
   wherein the identifier device (NODE) is entered into "Broadcasting Mode" and becomes a Broadcasting NODE in the event that the wireless or Radio Frequency (RF) link between the identifier device (NODE) and the observing device (NODE Owner) is disconnected;
   wherein the observing device (NODE Owner) and the participating observing device are implemented with suitable application software (NODE-APP) in association with the host apparatus;
   wherein the application software (NODE-APP) of the observing device (NODE Owner) sends identity of identifier device (NODE-ID) to the host apparatus or database server (NODE-SERVER) to register the NODE-ID as a "LOST NODE"; and wherein the application software (NODE-APP) of participating observing devices is connected to the host apparatus or database server (NODE-SERVER) to pull all the "LOST NODE" data periodically;
   wherein the participating observing devices will connect to the LOST NODE and retrieve LOST NODE's ID in the event that the participating observing devices detected the Broadcasting NODE and/or LOST NODE; and
   wherein any lost identifier devices (LOST-NODE) is discovered by any participating observing device whenever the participating observing device comes near within or into Radio Frequency (RF) range of the LOST NODE, in the event that there is a match between the LOST NODE's ID and NODE-APP-LOST-NODE-ID database.

2. The wireless pairing and tracking system claimed in claim 1, wherein the host apparatus includes any wireless network communication devices or database server (NODE-SERVER) which is accessible through internet and/or wireless or Radio Frequency (RF) link.

3. The wireless pairing and tracking system claimed in claim 1, wherein the identifier device (NODE) and/or any lost identifier devices (LOST-NODE) is paired with the observing device (NODE Owner) and/or participating observing devices via wireless or Radio Frequency (RF) connection.

4. The wireless pairing and tracking system claimed in claim 1, wherein the identity of identifier device (NODE-ID) is stored in the observing device (NODE Owner) via the application software (NODE-APP) after the identifier device (NODE) is paired with the observing device (NODE Owner).

5. The wireless pairing and tracking system claimed in claim 1, wherein the identifier device (NODE) includes a processor and said processor serves to detect the movements of the identifier device (NODE) and record the date and time of such instance.

6. The wireless pairing and tracking system claimed in claim 5, wherein the processor in the identifier device (NODE) starts a timer and continuously recording elapsed time in the event that Real Time Clock is not provided and the identifier device (NODE) is stopped from moving.

7. The wireless pairing and tracking system claimed in claim 6, wherein the recorded elapsed time indicates time interval of the identifier device (NODE) has been stopped from being moved, and defined as "Last Being Moved Time Interval".

8. The wireless pairing and tracking system claimed in claim 5, wherein the processor in the identifier device (NODE) stops the timer and resets the elapsed time to zero in the event that the identifier device (NODE) is being moved again.

9. The wireless pairing and tracking system claimed in claim 8, wherein the elapsed time remains zero until the identifier device (NODE) is stopped from being moved again for certain time interval, which the processor will start the time elapsed recording steps over again.

10. The wireless pairing and tracking system claimed in claim 1, wherein a user can activate a "search for me" or "Web Search Me" function in the observing device (NODE Owner) via application software (NODE-APP).

11. The wireless pairing and tracking system claimed in claim 1, wherein the "LOST NODE" data is stored into NODE-APP-LOST-NODE-ID database of the participating observing devices, and the participating observing devices will have this latest LOST NODE's ID stored.

12. The wireless pairing and tracking system claimed in claim 1, wherein the application software (NODE-APP) in any of the participating observing devices scans the participating observing devices' environment and to check any Broadcasting NODE or LOST NODE within the Radio Frequency (RF) range.

13. The wireless pairing and tracking system claimed in claim 12, wherein the participating observing devices retrieve the LOST NODE's ID and compare within the NODE-APP-LOST-NODE-ID database.

14. The wireless pairing and tracking system claimed in claim 12, wherein the Broadcasting NODE and/or LOST NODE can also be detected, where after retrieving the LOST NODE's ID, the NODE-APP of the participating observing device can send the LOST NODE's ID to the NODE-SERVER and to allow the NODE-SERVER to perform a search in NODE-APP'S LOST NODE database.

15. The wireless pairing and tracking system claimed in claim 14, wherein the NODE-SERVER notifies the NODE-APP of the participating observing device that the participating observing device is in RF range of the LOST NODE when there is a match of LOST NODE's ID in the LOST NODE database.

16. The wireless pairing and tracking system claimed in claim 15, wherein the application software (NODE-APP) activates participating observing device's Mobile Position/Location Determination function to obtain the geographical coordinates.

17. The wireless pairing and tracking system claimed in claim 16, wherein the geographical coordinates information with Received Signal Strength Indication (RSSI) value between the LOST NODE found and the participating observing devices is updated to the database server (NODE-SERVER).

18. The wireless pairing and tracking system claimed in claim 17, wherein latest LOST NODE movement date and time (or "Last Being Moved Time Interval") is also updated to the database server (NODE-SERVER).

19. The wireless pairing and tracking system claimed in claim 18, wherein the "Last Being Moved Time Interval" is retrieved by participating observing device and updated to the database server (NODE-SERVER) in the event that Real Time Clock is not provided in the system.

20. The wireless pairing and tracking system claimed in claim 19, wherein the "Last Being Moved Time Interval" is the total time elapsed since the last movement of the LOST NODE.

21. The wireless pairing and tracking system claimed in claim 18, wherein the NODE-SERVER immediately push all information to the observing device (NODE Owner) which reported the LOST NODE via "Search for Me" or "Web Search Me" activation.

22. The wireless pairing and tracking system claimed in claim 21, wherein the application software (NODE-APP) of the observing device (NODE Owner) will alert the user and show the geographical coordinates information which has been stored in the database server (NODE-SERVER), by either pulled from or pushed by the NODE-SERVER.

23. The wireless pairing and tracking system claimed in claim 22, wherein the application software (NODE-APP) of the observing device (NODE Owner) will only pull the geographical coordinates with highest RSSI value, or the NODE-SERVER will only push the geographical coordinates with highest RSSI value to the observing device (NODE Owner), should more than one participating observing devices detect the LOST NODE.

24. The wireless pairing and tracking system claimed in claim 23, wherein the application software (NODE-APP) will alert the user to deactivate the "Search for Me" or "Web Search Me" function whenever the user's observing device (NODE Owner) comes within Radio Frequency (RF) range of the LOST NODE.

25. The wireless pairing and tracking system claimed in claim 24, wherein the application software (NODE-APP) of the observing device (NODE Owner) will automatically identify and connect to the LOST NODE, said NODE-APP will then alert the user and show the "LOST NODE RSSI" value.

26. The wireless pairing and tracking system claimed in claim 25, wherein the nearer the observing device (NODE Owner) approaches the LOST NODE, the higher RSSI value; and the user is based on the RSSI value to find and retrieve back the LOST NODE.

27. The wireless pairing and tracking system claimed in claim 24, wherein the application software (NODE-APP) will then update the database server (NODE-SERVER) that the LOST NODE has been found as soon as the user de-activates the "Search for Me" or "Web Search Me" function.

* * * * *